(12) United States Patent
Yoshitake

(10) Patent No.: US 8,189,005 B2
(45) Date of Patent: May 29, 2012

(54) SCREEN DISPLAY CONTROL DEVICE

(75) Inventor: Michio Yoshitake, Fukuoka-ken (JP)

(73) Assignee: Seiko Epson Corporation, Tokyo (JP)

(*) Notice: Subject to any disclaimer, the term of this patent is extended or adjusted under 35 U.S.C. 154(b) by 711 days.

(21) Appl. No.: 12/381,266

(22) Filed: Mar. 10, 2009

(65) Prior Publication Data
US 2009/0225374 A1 Sep. 10, 2009

(30) Foreign Application Priority Data
Mar. 10, 2008 (JP) ................. 2008-058977

(51) Int. Cl.
G06T 9/00 (2006.01)
G06T 1/60 (2006.01)
G06F 13/00 (2006.01)
G09G 5/36 (2006.01)
(52) U.S. Cl. ......... 345/555; 345/530; 345/537; 345/545
(58) Field of Classification Search .................. 345/555, 345/545, 537, 530, 538
See application file for complete search history.

(56) References Cited

U.S. PATENT DOCUMENTS
5,430,555 A * 7/1995 Sawada et al. ............... 382/232

FOREIGN PATENT DOCUMENTS
JP 2007-235189 9/2007
* cited by examiner

Primary Examiner — Hau Nguyen
(74) Attorney, Agent, or Firm — Nutter McClennen & Fish LLP; John J. Penny, Jr.; Michael P. Visconti, III

(57) ABSTRACT

Provided is a screen display control device including: a compression unit which compresses image data; a rewritable video memory in which the data compressed by the compression unit of image data of one frame including line data (Y (Y: natural number) pixels/one line) of X (X: natural number) lines is written asynchronously with reading; an expansion unit which expands the compressed data which is periodically read from the video memory in synchronization with a frame period of a screen display, and restores original image data; a display unit which displays an image of the image data expanded and restored by the expansion unit; an input image data holding unit which holds input image data of one frame including line data (X pixels/one line) of Y lines by M (M: natural number, M<Y) lines; and a data replacement control unit which performs a replacement process.

2 Claims, 13 Drawing Sheets

SCREEN DISPLAY CONTROL DEVICE

BACKGROUND

1. Technical Field

The present invention relates to a technique of performing screen display control.

2. Related Art

In the related art, a printing apparatus including a liquid crystal display for displaying a menu image or an input photographic image, such as a printing apparatus disclosed in JP-A-2007-235189 (paragraph 0021, FIG. 1 and so on), is known. This type of printing apparatus includes a screen display control device which processes image data and has a video memory (videoRAM) for temporarily storing the processed data, and periodically reads the processed image data stored in the video memory so as to perform a screen display on the liquid crystal display. However, in a recent liquid crystal display, the capacity of image data displayed on the liquid crystal display increases with high resolution and high gradation. Accordingly, in order to store the image data with the increased capacity, the capacity of the video memory needs to increase and thus cost increases. In order to solve such a problem, a technique of compressing image data by a known data compression method such as predictive coding (DPCM coding) of a difference between adjacent pixel data and storing the compressed data in a video memory is known. In addition, at the time of the screen display, the compressed data is read from the video memory and is expanded so as to restore original image data. Accordingly, it is possible to switch an image displayed on a screen by replacing the compressed data stored in the video memory with compressed data of a new image.

However, the liquid crystal display includes two types of liquid crystal displays such as so-called landscape scan type and portrait type scan type liquid crystal displays, but, recently, the dedicated portrait scan type liquid crystal display for a mobile telephone is mass-produced with low cost as a general-purpose product. Accordingly, in order to reduce manufacturing cost of a product such as a printing apparatus including a liquid crystal display, this portrait scan type liquid crystal display is desired to be employed. However, if a landscape type image in which the arrangement order of pixel data configuring image data differs is displayed on the portrait scan type liquid crystal display, this landscape type image data needs to be stored in a video memory after converting the configuration of the image data (the arrangement order of the pixel data) so as to be matched to a scan direction of the portrait scan type liquid crystal display.

However, since the data compressed using the difference between the adjacent pixel data of the image data is stored in the video memory, if a portion of the compressed data is rewritten, original image data cannot be restored and the compressed data stored in the video memory cannot be partially rewritten to new image data. Accordingly, since the pixel data is sequentially stored at a proper position of the video memory from leading pixel data of the input landscape type image data, the landscape type image data cannot be converted into the portrait type data configuration. Therefore, when the portrait type image stored in the video memory as the compressed data is replaced with the image data of the newly input landscape type image, first, the portrait type image data of one screen matched to the scan direction of the portrait scan type liquid crystal display needs to be formed by rearranging the pixel data configuring the input landscape type image data.

That is, after the landscape type image data is converted into the portrait type image data and the converted image data is stored in a buffer memory, the converted portrait type image data needs to be compressed by a compression unit and the compressed image data needs to be stored in the video memory. At this time, in order to form line data of each line of the portrait type image data, since a portion of the line data of every line of the input landscape type image data is necessary, all the input landscape type image data needs to be temporarily stored in the buffer memory. Accordingly, in order to convert the landscape type image data into the portrait image data, the buffer memory for storing at least the image data of one screen before compression is necessary. Thus, the cost is increased by employing the portrait scan type liquid crystal display with low cost.

SUMMARY

An advantage of some aspects of the invention is that it provides a technique of displaying an image based on input image data on a display unit, of which a scan direction differs from the arrangement order of pixel data configuring the input image data, by rearranging the pixel data configuring the input image data, with a simple configuration with low cost.

According to an aspect of the invention, there is provided a screen display control device including: a compression unit which compresses image data; a rewritable video memory in which the data compressed by the compression unit of image data of one frame including line data (Y (Y: natural number) pixels/one line) of X (X: natural number) lines is written asynchronously with reading; an expansion unit which expands the compressed data which is periodically read from the video memory in synchronization with a frame period of a screen display, and restores original image data; a display unit which displays an image of the image data expanded and restored by the expansion unit; an input image data holding unit which holds input image data of one frame including line data (X pixels/one line) of Y lines by M (M: natural number, M<Y) lines; and a data replacement control unit which performs a replacement process of replacing the M lines held in the input image data holding unit of the image data restored by the expansion unit with the input image data and outputting the replaced data to the compression unit, at the time of reading the compressed data of one frame from the video memory, and replaces all the compressed data of the video memory with the input image data by repeating the replacement process n (n: natural number of $1 \leq n \leq Y/M$) times, wherein the data replacement control unit replaces $(Y-nM+1)^{th}$ to $(Y-(n-1)M)^{th}$ pixel data of $m^{th}$ (m: $1 \leq m \leq X$) line data configuring the image data restored by the expansion unit with $m^{th}$ pixel data of each line data of $nM^{th}$ to $((n-1)M+1)^{th}$ lines of the input image data, at the time of an $n^{th}$ replacement process.

According to another aspect of the invention, there is provided a screen display control device including: a compression unit which compresses image data; a rewritable video memory in which the data compressed by the compression unit of image data of one frame including line data (Y (Y: natural number) pixels/one line) of X (X: natural number) lines is written asynchronously with reading; an expansion unit which expands the compressed data which is periodically read from the video memory in synchronization with a frame period of a screen display, and restores original image data; a display unit which displays an image of the image data expanded and restored by the expansion unit; an input image data holding unit which holds input image data of one frame including line data (X pixels/one line) of Y lines by M (M:

natural number, M<Y) lines; and a data replacement control unit which performs a replacement process of replacing the M lines held in the input image data holding unit of the image data restored by the expansion unit with the input image data and outputting the replaced data to the compression unit, at the time of reading the compressed data of one frame from the video memory, and replaces all the compressed data of the video memory with the input image data by repeating the replacement process n (n: natural number of $1 \leq n \leq Y/M$) times, wherein the data replacement control unit replaces $((n-1)M+1)^{th}$ to $nM^{th}$ pixel data of $m^{th}$ (m: $1 \leq m \leq X$) line data configuring the image data restored by the expansion unit with $m^{th}$ pixel data of each line data of $((n-1)M+1)^{th}$ to $nM^{th}$ lines of the input image data, at the time of an $n^{th}$ replacement process.

In the invention, the line data of at least M lines of the input image data in which one frame includes the line data (X pixels/one line) of the Y lines is held in the input image data holding unit. In addition, the data replacement control unit performs the replacement process of replacing the M lines held in the input image data holding unit of the image data restored by the expansion unit with the input image data and outputting the replaced data to the compression unit, at the time of reading the compressed data of the image data of one frame including the line data (Y pixels/one line) of the X lines from the video memory, and replaces all the compressed data of the video memory with the input image data by repeating the replacement process n (n: natural number of $1 \leq n \leq Y/M$) times.

That is, at the time of the $n^{th}$ replacement process, the pixel data of the input image data of the M lines held in the input image data holding unit is rearranged by the data replacement control unit so as to be matched to the configuration of the video memory, and is replaced with a portion of each line data configuring the image data restored by the expansion unit. By reading and restoring the compressed data, of which the portion is replaced with the input image data, from the video memory by the expansion unit, the image in which the portion of the original image is replaced with the input image is displayed on the display unit. By repeating this process n times, all the pixel data configuring the input image data can be rearranged so as to be matched to the configuration of the video memory and the compressed data of the input image data, in which the pixel data is rearranged, can be stored in the video memory. Accordingly, the rearrangement of the pixel data configuring the input image data can be performed by using the image data restored from the compressed data in the video memory and holding the input image data of at least M lines in one replacement process, and the image based on the input image data can be displayed on the display unit of which the scan direction differs from the arrangement order of the pixel data configuring the input image data, with a simple configuration with low cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
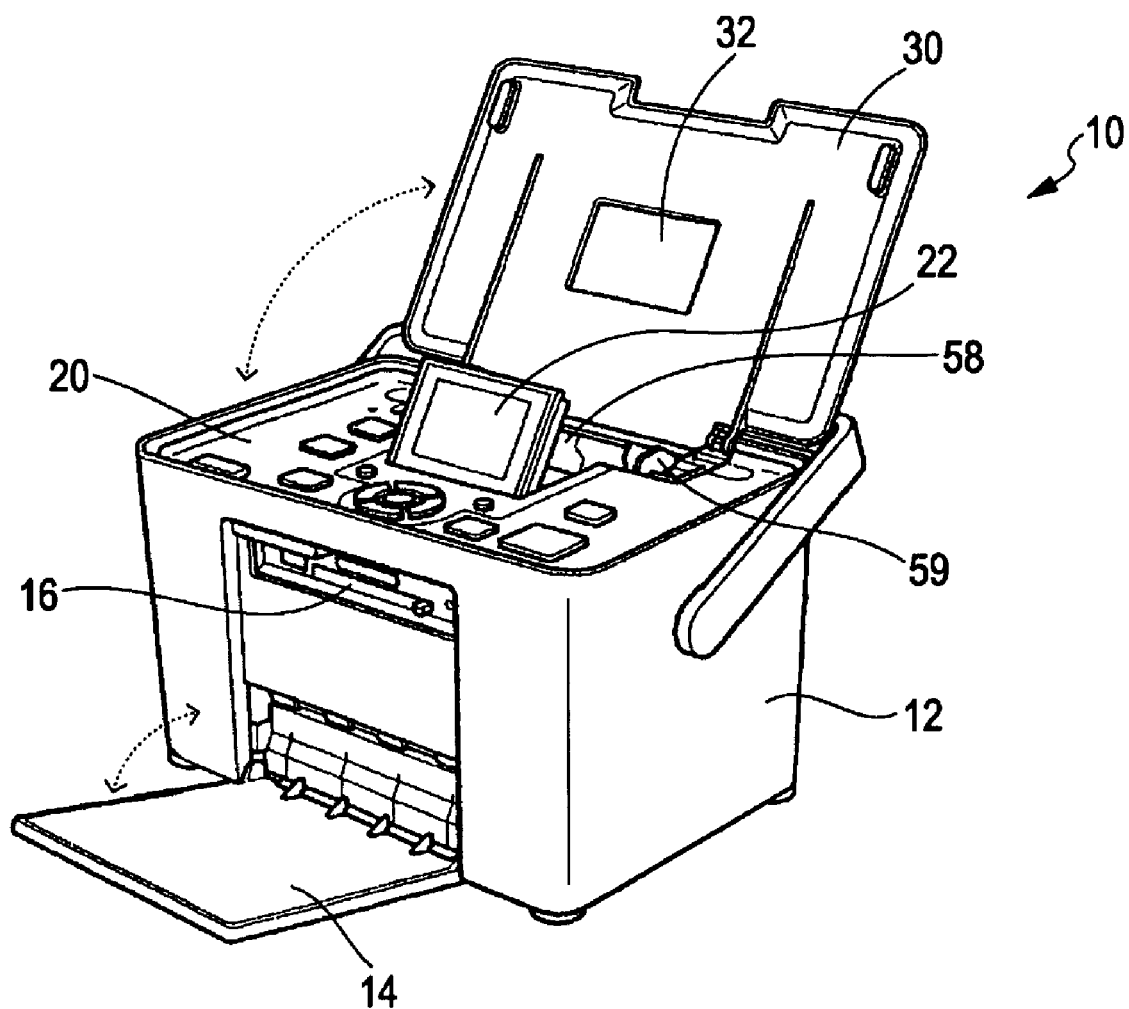
FIG. 1 is a perspective view showing a photo printer in which a screen display control device of the invention is mounted.
Figure 2:
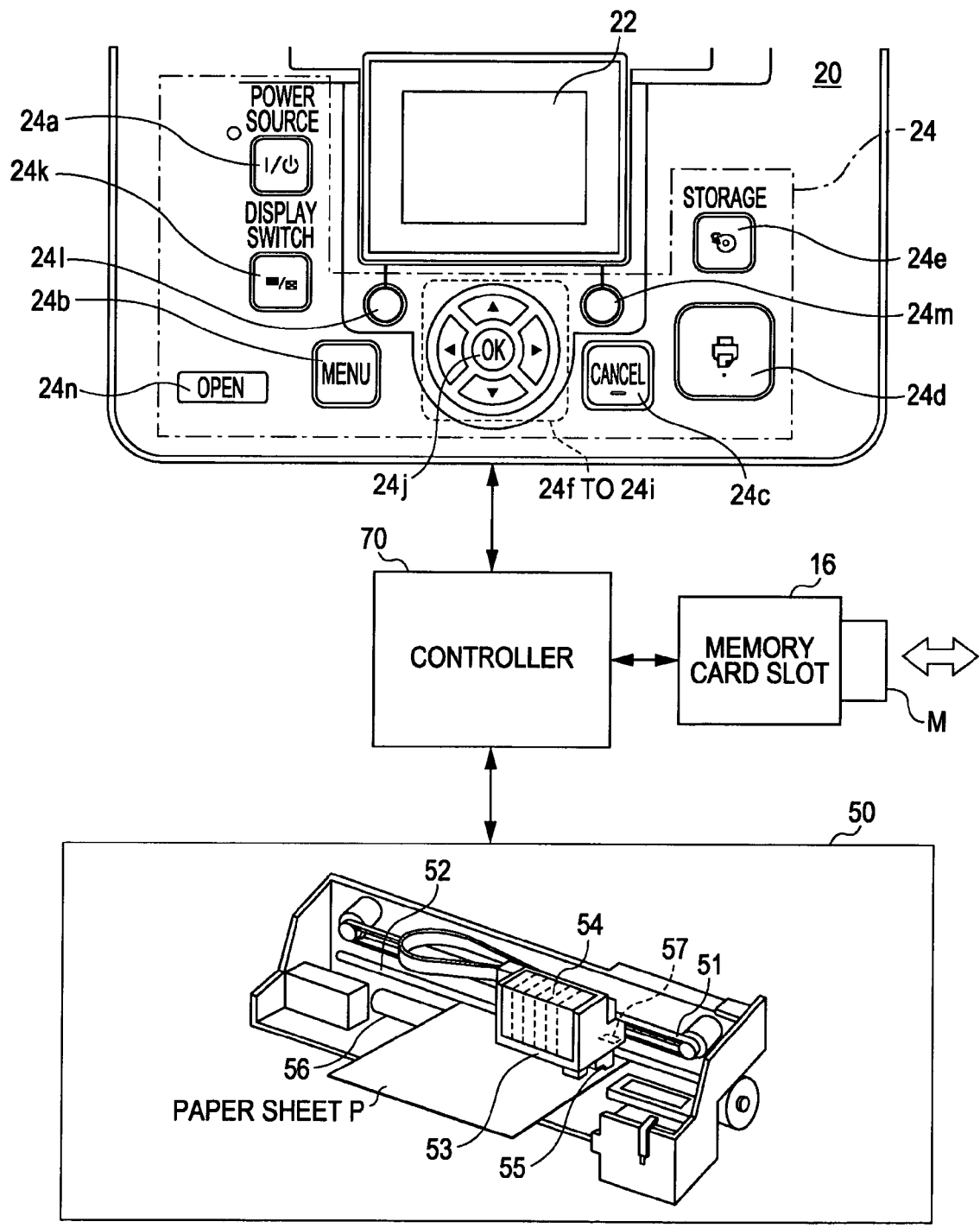
FIG. 2 is a view showing the schematic internal configuration of the photo printer.

FIG. 1 is a perspective view showing a photo printer 10 in which an LCD controller 76 of a screen display control device according to an embodiment of the invention is mounted. FIG. 2 is a view showing the schematic internal configuration of the photo printer 10. In this photo printer 10, a print mechanism 50 (see FIG. 2) is built in a printer main body 12, and performs printing on paper P according to an operation command from a controller 70 (see FIG. 2) for performing the whole control of the photo printer 10. Then, the printed paper is ejected to the front surface of the printer main body 12.

In the front surface of this printer main body 12, as shown in FIG. 1, a front surface door 14 is openably and closably mounted. This front surface door 14 is a cover for opening and closing the front surface of the printer main body 12. The front surface door functions as an ejection tray for receiving the paper P ejected from the print mechanism 50 in an opened state. In addition, various types of memory card slots 16 provided in the front surface of the printer main body 12 becomes a state of being available by a user. That is, in this state, the user may insert a memory card M for storing an image file to be printed into the memory card slots 16. An external medium for storing image file data is not limited to the memory card and other media such as a USB memory or a disc medium may be used. In addition, an electronic apparatus such as a digital camera or a mobile telephone for storing an image may be connected to the photo printer 10 by communication using a cable or infrared rays, thereby functioning as the external medium.

In addition, an operation panel 20 is provided on the upper surface of the printer main body 12, and a cover 30 is openably and closably mounted in one side of the back of the upper surface of the printer main body 12. This cover 30 is a resin plate molded with a size capable of covering the upper surface of the printer main body 12, and externally exposes the surface of the operation panel 20 in an opened state (see FIG. 1). In contrast, if the cover 30 is closed, the whole operation panel 20 is covered.

In this operation panel 20, a display unit 22 composed of, for example, an LCD display for displaying characters, figures, symbols or the like and a button group 24 arranged in the vicinity of the display unit 22 are included. The button group 24 includes, as shown in FIG. 2, a power button 24a for performing ON/OFF of a power source, a menu button 24b for calling a main menu screen, a cancel button 24c for canceling the operation halfway or interrupting printing on paper P halfway, a print button 24d for instructing the printing on the paper P, a storage button 24e for storing an edited image or the like in the memory card M inserted into the memory card slots 16, up, down, right and left arrow buttons 24f to 24i operated when a desired choice is selected from a plurality of choices displayed on the display unit 22 or a cursor is moved, an OK button 24j which is arranged in the center of the up, down, right and left arrow buttons 24f to 24i, for instructing the determination of the choice selected by the arrow buttons 24f to 24i, a display switch button 24k for switching the screen display on the display unit 22, a left guide selection button 24l for selecting left guide displayed on the display unit 22, a right guide selection button 24m for selecting right guide displayed on the display unit 22, and an ejection tray open button 24n for opening the front surface door 14 functioning as the ejection tray.

In addition, in order to check the display contents of the display unit 22, a window 32 having the same size as the display unit 22 is provided in the cover 30. That is, in the state in which the cover 30 is closed, the user can check the display contents of the display unit 22 via this window 32. In contrast, in the state in which the cover 30 is opened, the display unit 22 can be adjusted to a desired angle as shown in FIG. 1.

In the state in which the cover 30 is opened, the cover 30 is held in a state of being obliquely sloped backward with respect to the operation panel 20 and is available as the tray for supplying the paper P to the print mechanism 50. In addition, a paper feeding port 58 of the print mechanism 50 is provided in the back of the operation panel 20 and a pair of paper guides 59 which slides in a right/left direction such that the guide width is matched to the width of the paper.

In addition, the paper P is fed to the print mechanism 50 via the paper feeding port 58 and printing is performed. In the print mechanism 50, as shown in FIG. 2, a carriage 53 is driven by a timing belt 51 stretched in a loop shape in the right/left direction and is reciprocally moved to the right/left along a guide 52. In this carriage 53, a paper end detecting sensor 57 is provided so as to detect the right/left end or the upper/lower end of the paper P. That is, the paper end detecting sensor 57 detects the right/left end of the paper when the carriage 53 is scanned in the right/left direction before printing with respect to the paper set in the paper feeding port 58 so as to recognize the width of the paper or detects the rear end of the paper during printing so as to recognize the length of the paper.

In addition, in this carriage 53, ink cartridges 54 for individually storing inks of respective colors such as cyan, magenta, yellow and black are mounted. Such ink cartridges 54 are connected to print heads 55, respectively. In addition, the print heads 55 apply pressure to the inks of the ink cartridges 54 and eject the inks from nozzles (not shown) to the paper P. In this embodiment, the print heads 55 employs a method of applying a voltage to a piezoelectric element and deforming the piezoelectric element so as to pressurize the inks. However, a method of applying a voltage to a heating resistor (for example, a heater or the like) and pressurizing the inks due to air bubbles generated by heating the inks may be employed. The printed paper P is fed to the front surface door (ejection tray) 14 which is opened by a transportation roller 56.

Although not shown, a battery pack can be mounted in the rear surface of the printer main body 12 and thus the present printer 10 can be operated by the battery although not connected to a power source available commercially. In addition, since the present printer 10 is a stand-alone printer which can be used although not connected to a host computer, the present printer 10 can be easily carried and can be used anywhere.

Figure 3:
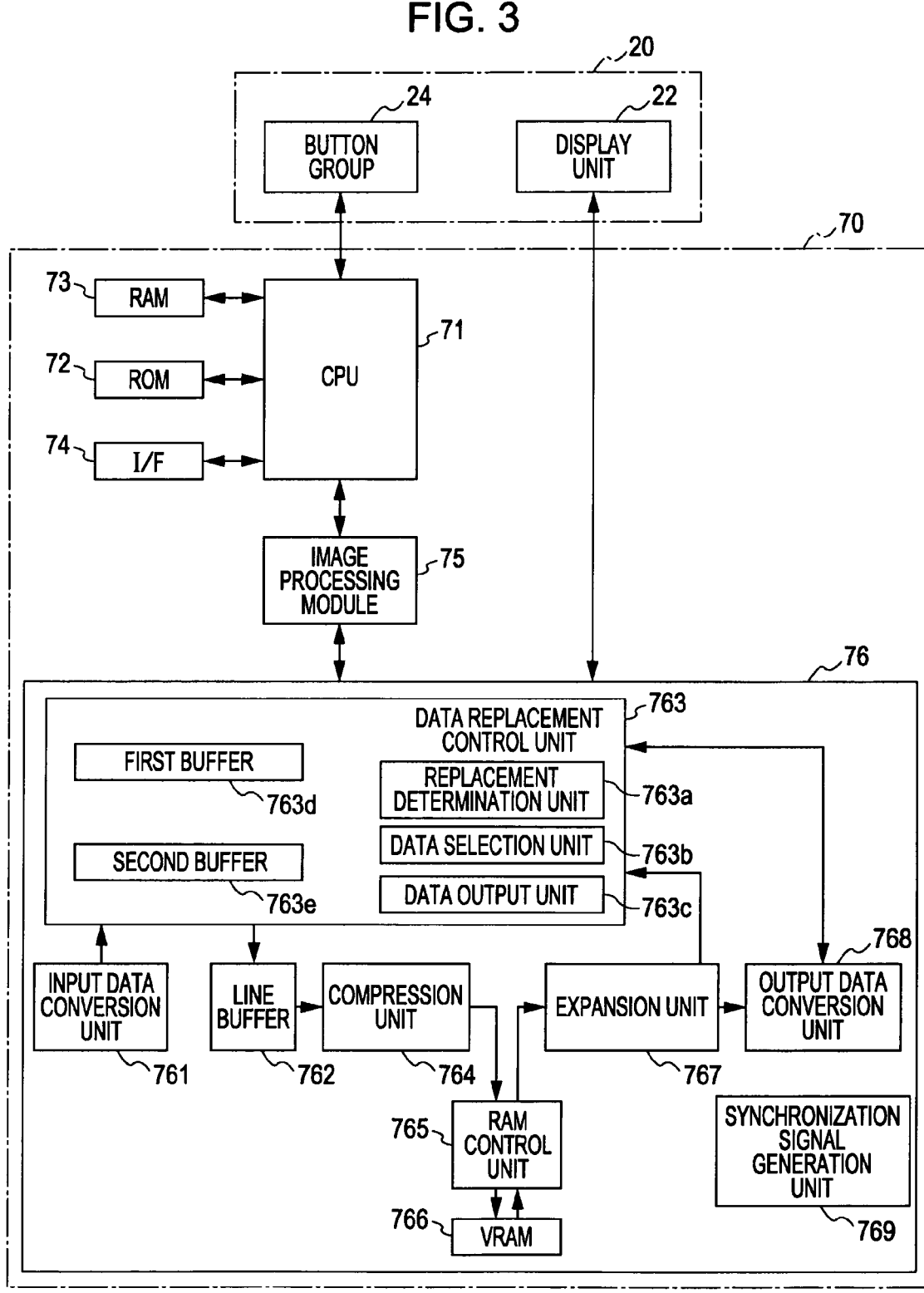
FIG. 3 is block diagram showing the configuration of a controller.
Figure 4:
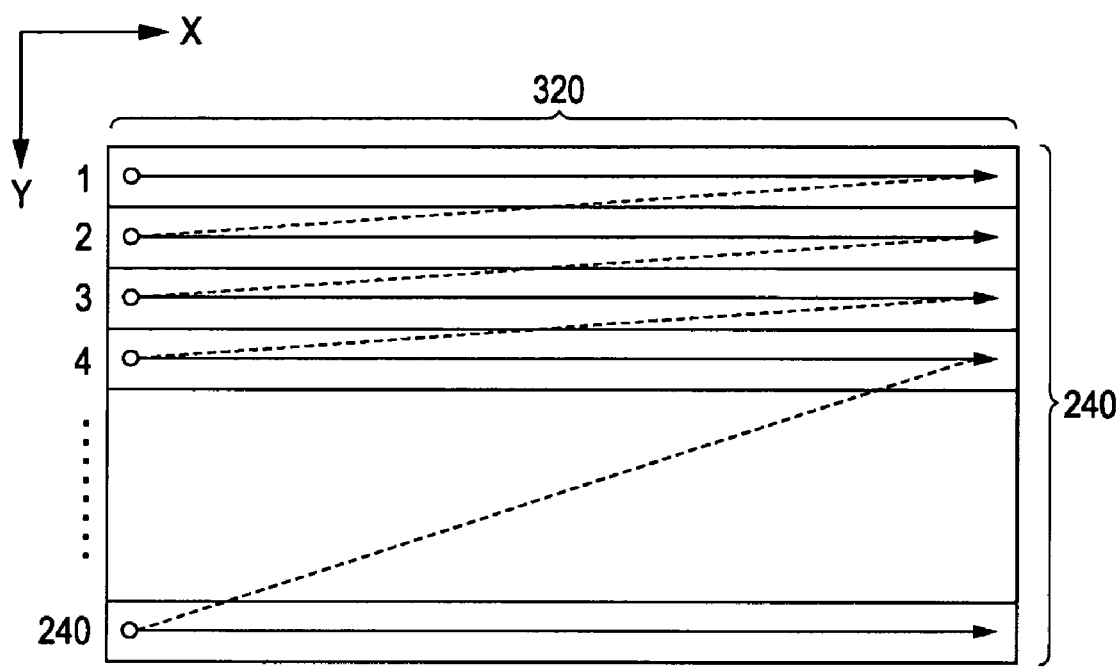
FIG. 4 is a view showing the configuration of input image data.
Figure 5:
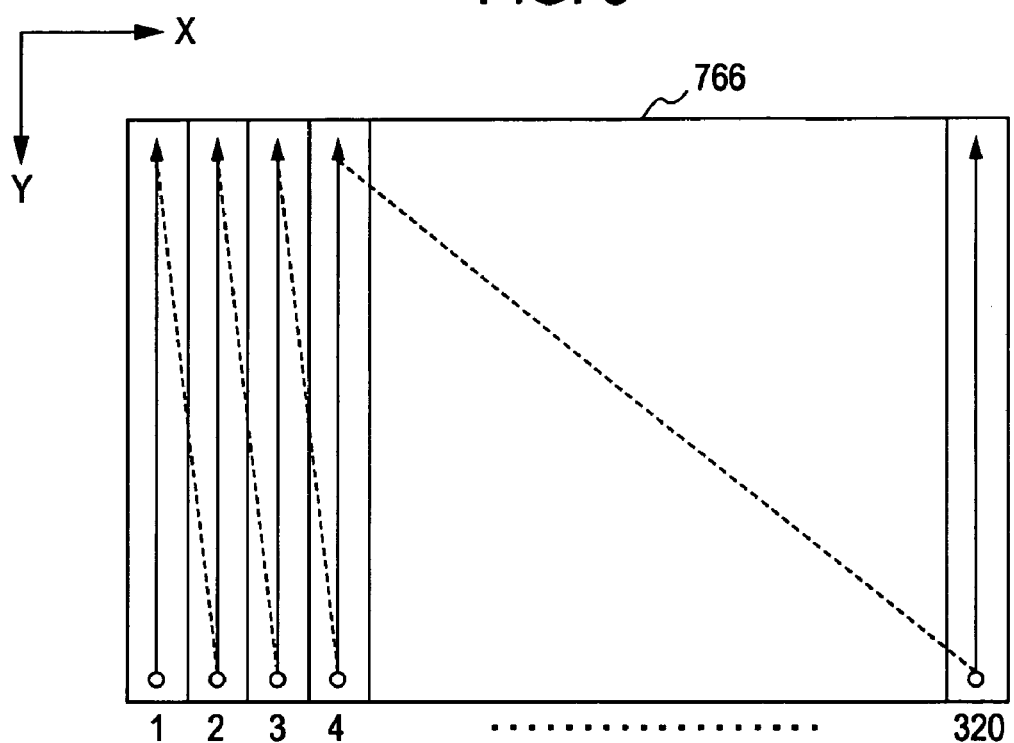
FIG. 5 is a view showing the configuration of a VRAM.
Figure 6:
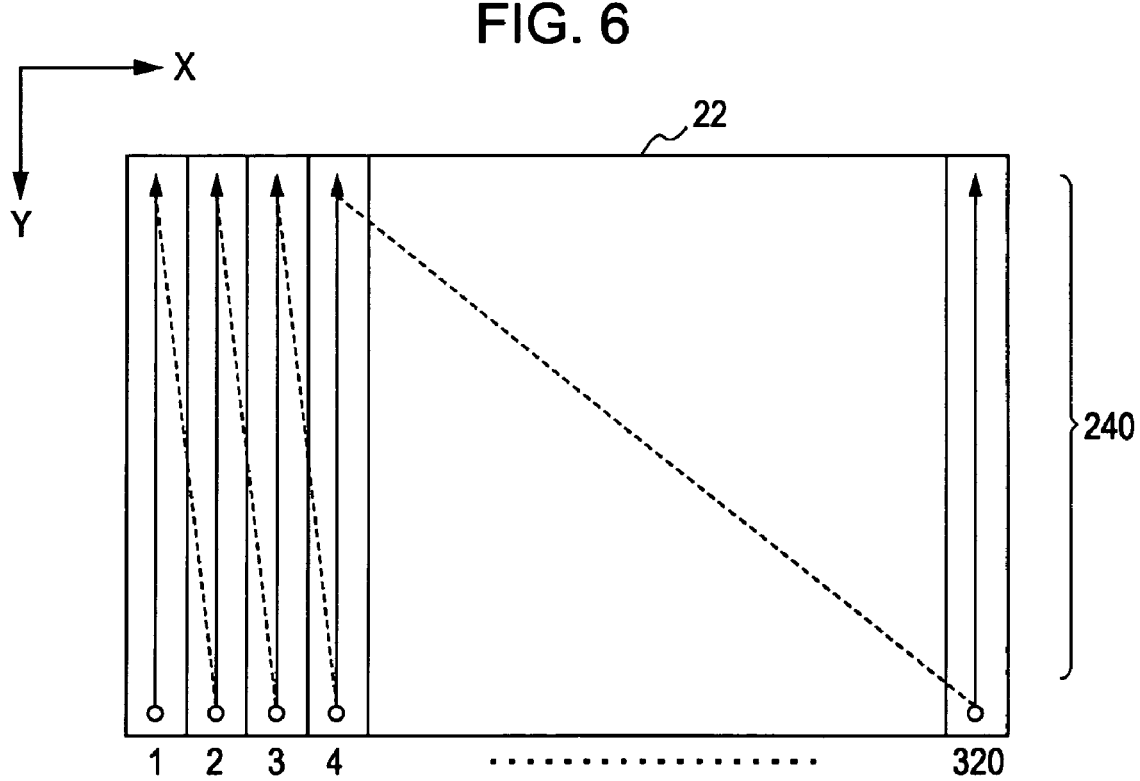
FIG. 6 is a view showing the configuration of a display unit.

FIG. 3 is block diagram showing the configuration of a controller 70. FIG. 4 is a view showing the configuration of input image data. FIG. 5 is a view showing the configuration of a VRAM 766. FIG. 6 is a view showing the configuration of a display unit. As shown in FIG. 3, the controller 70 includes a microprocessor mainly including a CPU 71, and includes a ROM 72 for storing various types of processing programs, various types of data, various types of programs, various types of tables or the like, a RAM 73 for temporarily storing data, an interface (I/F) 74 for performing communication with the print mechanism 50 or the memory card slots 16, and so on. In addition, the controller 70 outputs a control signal to a print head 55 of the print mechanism 50 or a control signal to the display unit 22 of the operation panel, in addition to the storage of an edited image or the like in the memory card M.

In addition, in the controller 70, an image processing module 75 for performing necessary image processing with respect to input image data received from an external storage medium such as the memory card M or the like via the interface 74 is provided. The image processing module 75 has a function for generating image data corresponding to an inherent image of the printer, such as a menu screen displayed on the display unit 22.

RGB image data output from the image processing module 75 is given to an LCD controller 76 (corresponding to a "screen display control device" of the invention) for controlling the display of the display unit 22. In addition, in the present embodiment, as shown in FIG. 6, the pixel number of the display unit 22 configured by the LCD display is 320 dots×240 dots in a quarter video graphics array (QVGA) format, one line of image data is configured by pixel data of 240 dots, an image of one frame is configured by line data of 320 lines. Meanwhile, the input image data of one frame input from the image processing module 75 to the LCD controller 76 is, as shown in FIG. 4, image data corresponding to one screen of the display unit 22 having a size of 320 dots×240 dots, one line of input image data is configured by pixel data of 320 dots, and input image data of one frame is configured by line data of 240 lines.

The LCD controller 76 includes a synchronization signal generation unit 769 and can generate various synchronization signals such as a horizontal/vertical synchronization signal for controlling image display timings to the display unit 22, and so on. In addition, the LCD controller further includes an input data conversion unit 761 for converting serial data received from the image processing module 75 into parallel data, and a data replacement control unit 763 for receiving the input image data converted into the parallel data by the input data conversion unit 761, rearranging pixel data configuring the received input image data and outputting the pixel data to a line buffer 762 while the input image data converted into the parallel data by the input data conversion unit 761 is received. The line buffer 762 is configured to temporarily hold image data of one line (240 pixels) of the display unit 22, which is output from the data replacement control unit 763. The configuration of the data replacement control unit 763 will be described in detail later.

In addition, the LCD controller 76 further includes a compression unit 764 which is provided on the post-stage of the line buffer 762, for compressing the input image data in the unit of lines, a rewritable VRAM 766 (corresponding to a "video memory" of the invention) in which the data compressed by the compression unit 764 in the unit of lines is written asynchronously with reading, an expansion unit 767 for expanding the compressed data periodically read from the VRAM 766 in the unit of lines in synchronization with a horizontal (line period)/vertical (frame period) synchronization signal of the screen display to the display unit 22 and restoring original image data, and an output data conversion unit 768 for performing data conversion for outputting the image data expanded and restored by the expansion unit 767 to the display unit 22. Accordingly, the image data expanded and restored by the expansion unit 767 is output to and displayed on the display unit 22 via the output data conversion unit 768.

In addition, as shown in FIG. 5, in the VRAM 766, an area for storing at least the compressed data of 320 lines (the image of one frame) compressed by the compression unit 764 is provided. In the present embodiment, compressed data of lines 1, 2, 3, 4, . . . , and 320 are stored in the storage areas indicated by memory addresses 1, 2, 3, 4, . . . , and 320 of the VRAM 766, respectively. In addition, the LCD controller 76 further includes a RAM control unit 765 for controlling the write of the compressed data to the VRAM 766 and the write and read of the image data to and from the line buffer 762, and the compression of the image data of one line stored in the line buffer 762 and the writing timing of the compressed data to the VRAM 766 are controlled. In addition, in the present embodiment, the compression unit 764 compresses the image data using difference information (matching state) of adjacent pixel data. Accordingly, the line-based compressed data can be sequentially expanded and restored from the leading pixel data of each line. In addition, the method of compressing the image data is not limited to this and various known methods may be used. Such data compressing methods are known techniques and thus the detailed description thereof will be omitted.

As described above, in the present embodiment, the arrangement order of the pixel data configuring the input image data from the image processing module 75 is of a so-called landscape type (see an arrow of FIG. 4). Meanwhile, the writing direction of the compressed data to the VRAM 766 and the reading direction of the compressed data are of a so-called portrait type (see an arrow of FIG. 5). In addition, the screen scan direction of the display unit 22 is of the portrait type similar to the VRAM 766 and is different from the arrangement order of the pixel data configuring the input image data in the scan direction (see an arrow of FIG. 6). Therefore, in the present embodiment, the data replacement control unit 763 for rearranging the pixel data configuring the input image data using the image data restored from the compressed data of the VRAM 766 by the expansion unit 767 is included.

Next, the data replacement control unit 763 will be described in detail. As shown in FIG. 3, the data replacement control unit 763 includes first and second buffers 763d and 763e for holding line data of four lines of input image data of one frame (corresponding to an "input image data holding unit" of the invention). In the present embodiment, first, the line data of four lines of the input image data of one frame received from the image processing module 75 is held in the first buffer 763d. In addition, the line data of subsequent four lines is held in the second buffer 763e. In addition, as described above, all the line data of four lines held in the first buffer 763d is output to the line buffer 762 before the holding of the line data of subsequent four lines in the second buffer 763e is completed. Accordingly, the line data of subsequent four lines can be held in the first buffer 763d after the holding of the line data of four lines in the second buffer 763e is completed. In the present embodiment, the line data of four lines of the input image data can be alternately held in the first and second buffers 763d and 763e until all the input image data is received from the image processing module 75.

In addition, the data replacement control unit 763 performs a replacement process of replacing the image data of four lines held in the first buffer 763d or the second buffer 763e of the image data restored by the expansion unit 767 with the input image data and outputting the image data to the compression unit 764 via the line buffer 762, at the time of read of the compressed data of one frame from the VRAM 766, and replaces all the compressed data of the VRAM 766 with the input image data by repeating this replacement process 60 times ((240 lines configuring the input image data)÷(four lines capable of being held in the first and second buffers 763d and 763e)). That is, whenever the vertical synchronization signal is output (frame period), the line data of four lines held in the first buffer 763d or the second buffer 763e is replaced with a portion of the image data restored by the expansion unit 767, and the replacement process is completed by repeating this replacement process 60 times.

In detail, the data replacement control unit 763 includes a replacement determination unit 763a for determining whether or not each pixel data configuring the restored image data will be replaced with the line data of four lines of the input image data held in the first buffer 763d or the second buffer 763e, and replaces a portion of the restored image data with the input image data held in the first buffer 763d or the second buffer 763e on the basis of the determined result of the replacement determination unit 763a. In addition, in the present embodiment, at the time of the replacement process of an $n^{th}$ ($1 \leq n \leq 60$), among an $m^{th}$ line data ($1 \leq m \leq 320$) configuring the image data restored by the expansion unit 767, $(214-4n)^{th}$ to $(244-4n)^{th}$ pixel data is replaced with the $m^{th}$ pixel data of each line data of $4n^{th}$ to $(4n-3)^{th}$ lines of the input image data.

In addition, the LCD controller 76 further includes a replacement process counter (not shown) for counting the number of times of the replacement process, a reading line counter (not shown) indicating the line read by the expansion unit 767 from the VRAM 766, and a read pixel counter (not shown) indicating the order of the pixel data, which is read by the expansion unit 767, of the line data indicated by the reading line counter. In addition, the replacement determination unit 763a determines whether or not the pixel data restored by the expansion unit 767 will be replaced with the input image data held in the first or second buffer 763d or 763e, on the basis of the replacement process counter value, the reading line counter value, and the read pixel counter value. The value of this read pixel counter is added on the basis of a clock signal generated by the synchronization signal generation unit 769 in order to define a read timing of the compressed data of one pixel from the VRAM 766. In addition, the read pixel counter is reset to "0" at the time of the output of the horizontal synchronization signal and is added for every clock signal for defining the read timing of the compressed data of one pixel generated by the synchronization signal generation unit 769. Accordingly, the horizontal synchronization signal is output and the addition from "0" of the read pixel counter is started.

In addition, a data selection unit 763b for selecting the pixel data output to the compression unit 764 via the line buffer 762 from any one of the restored image data and the input image data on the basis of the determined result of the replacement determination unit 763a is included, and the pixel data according to the selected result of the data selection unit 763b is output to the line buffer 762 by a data output unit 763c. That is, the data replacement control unit 763 receives the input image data from the image processing module 75 and the restored image data from the expansion unit 767 and selectively outputs such image data to the compression unit 764 via the line buffer 762. When image data of one line is stored in the line buffer 762, a command for storing the image data stored in the line buffer 762 in the VRAM 766 is sent from the data replacement control unit 763 to a RAM control unit 765, the image data of one line stored in the line buffer 762 is compressed by the compression unit 764 and is then stored in a predetermined area of the VRAM 766. Next, the process of rearranging the pixel data configuring the input image data will be described with reference to FIGS. 7 to 13.

Figure 7:
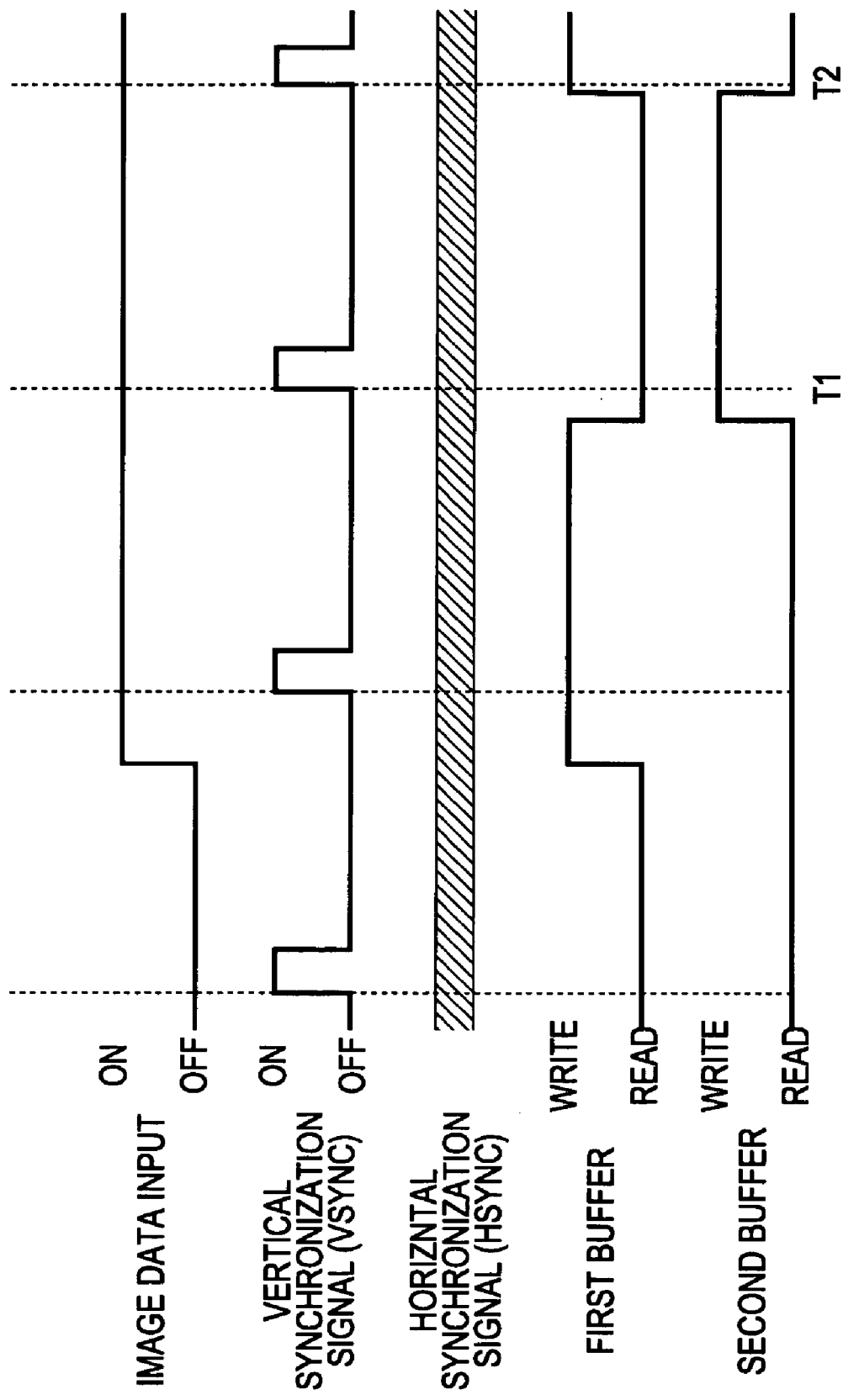
FIG. 7 is a timing chart showing timings when input image data is input.
Figure 8:
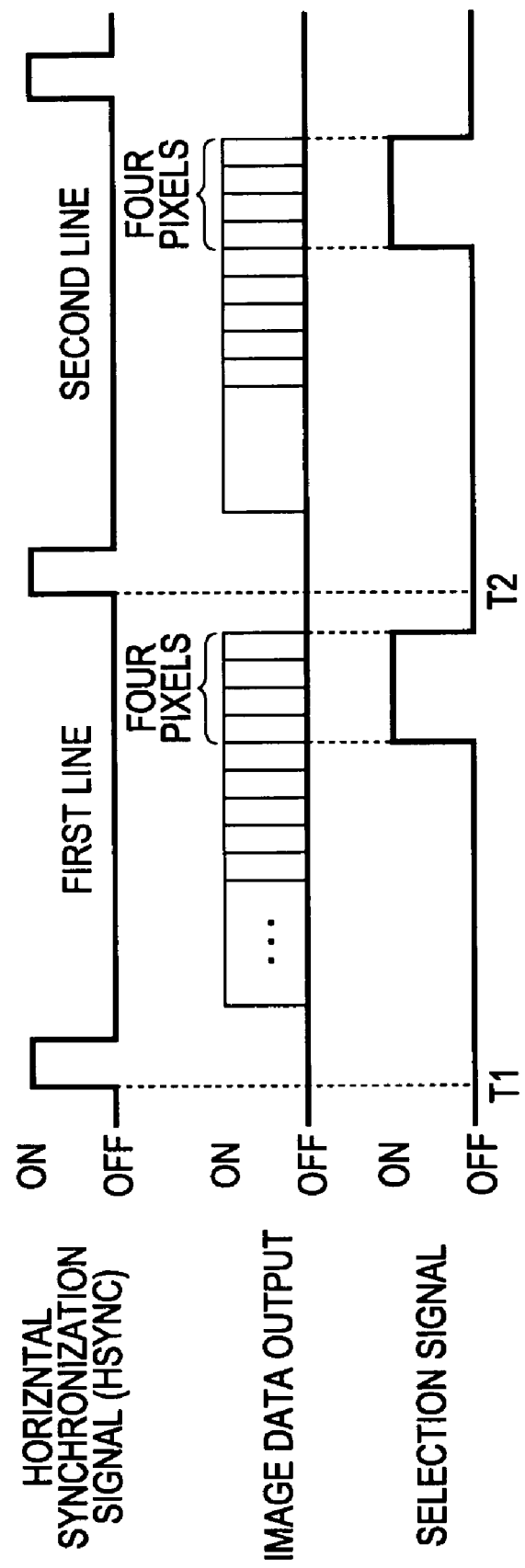
FIG. 8 is a timing chart showing timings when pixel data is replaced.
Figure 9:
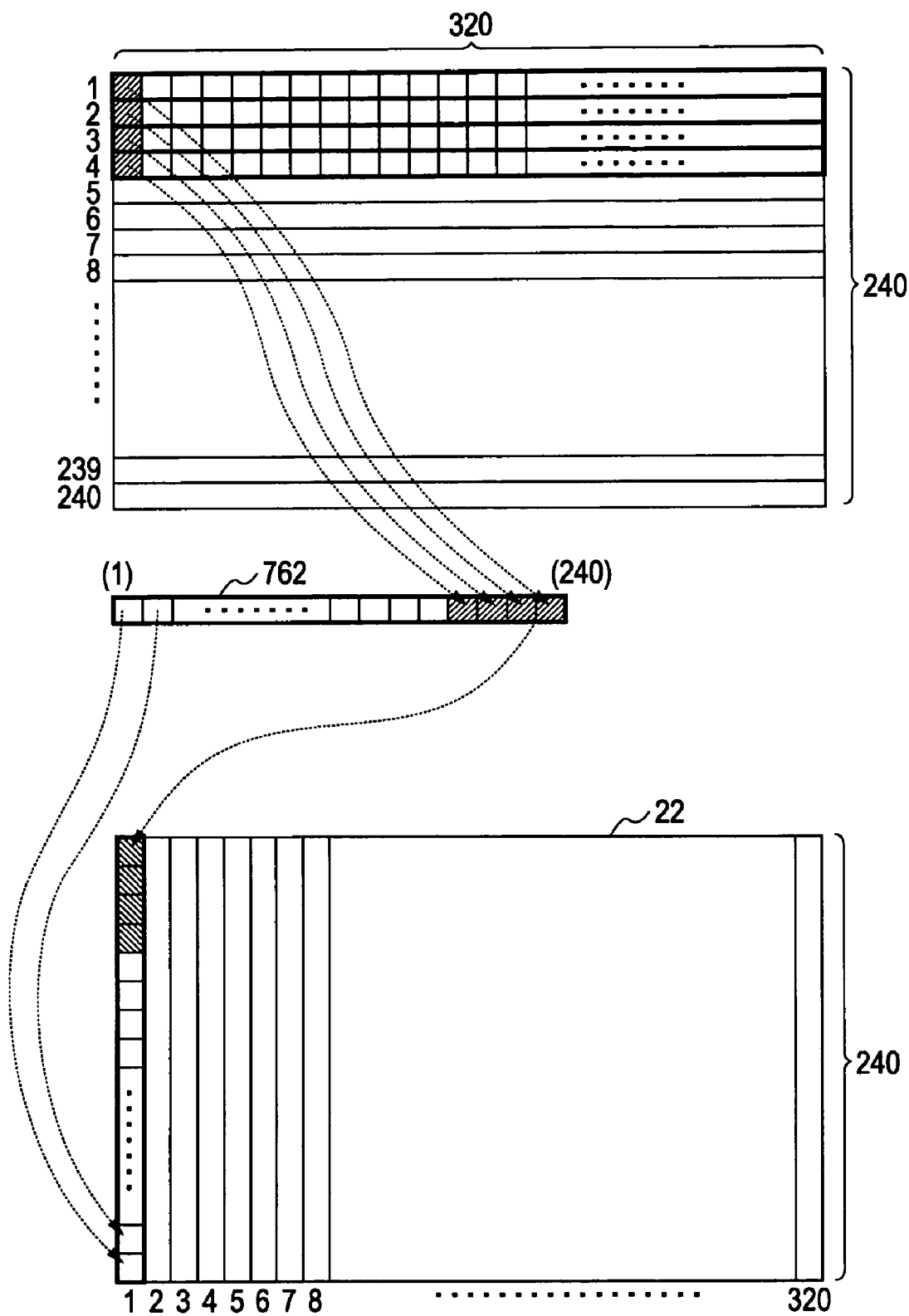
FIG. 9 is a conceptual diagram showing the partial replacement of image data.
Figure 10:
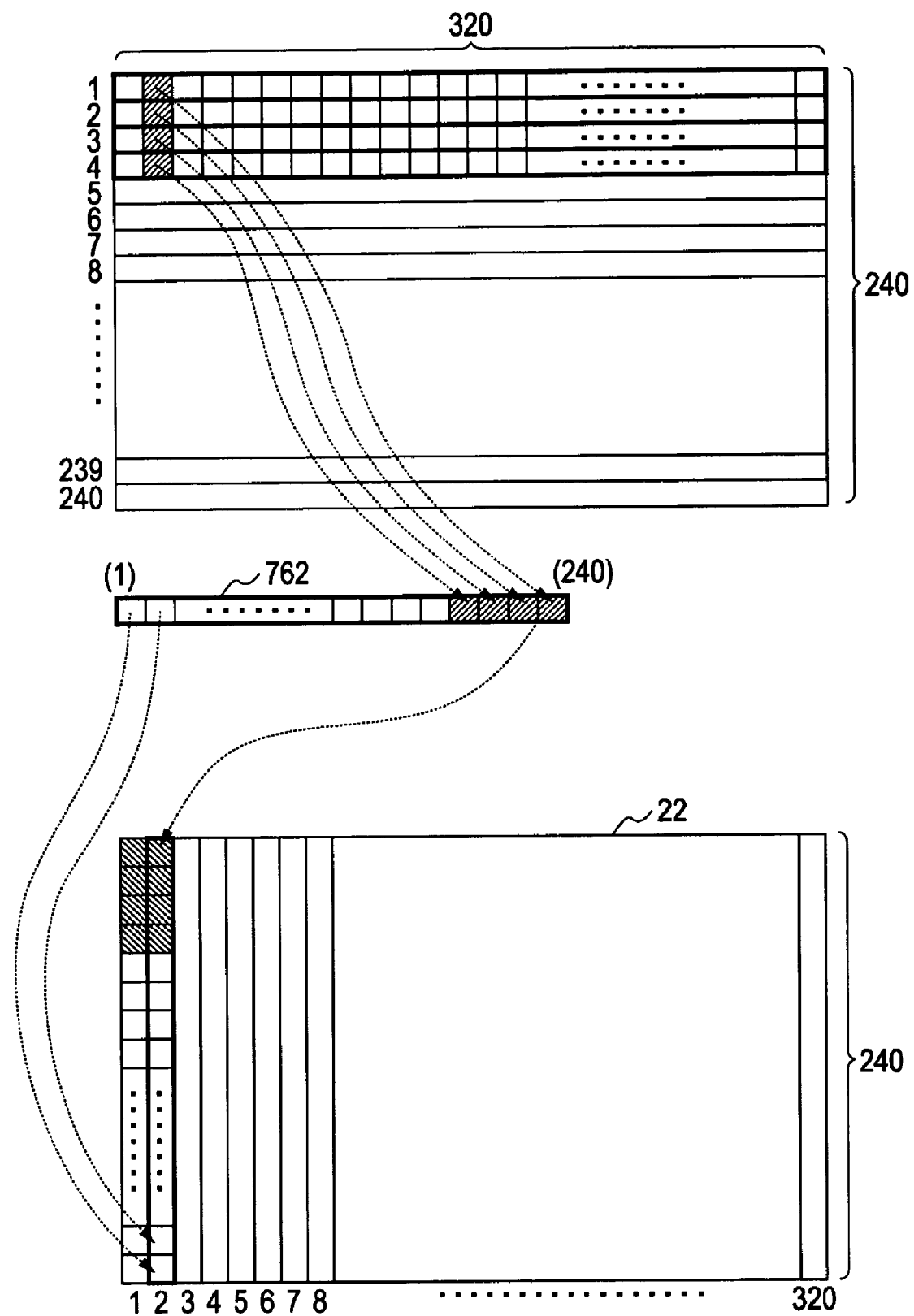
FIG. 10 is a conceptual diagram showing the partial replacement of image data.
Figure 11:
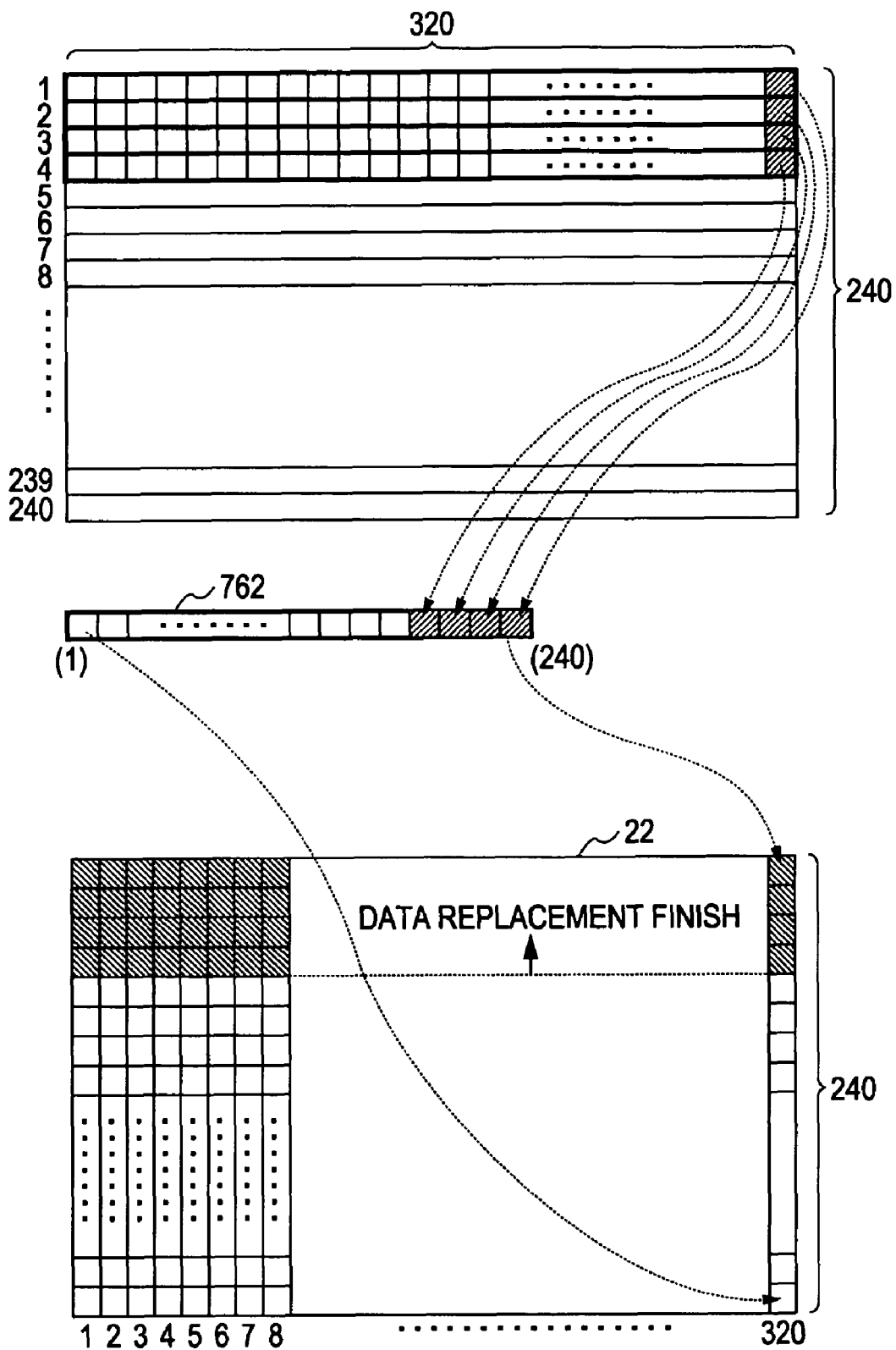
FIG. 11 is a conceptual diagram showing the partial replacement of image data.
Figure 12:
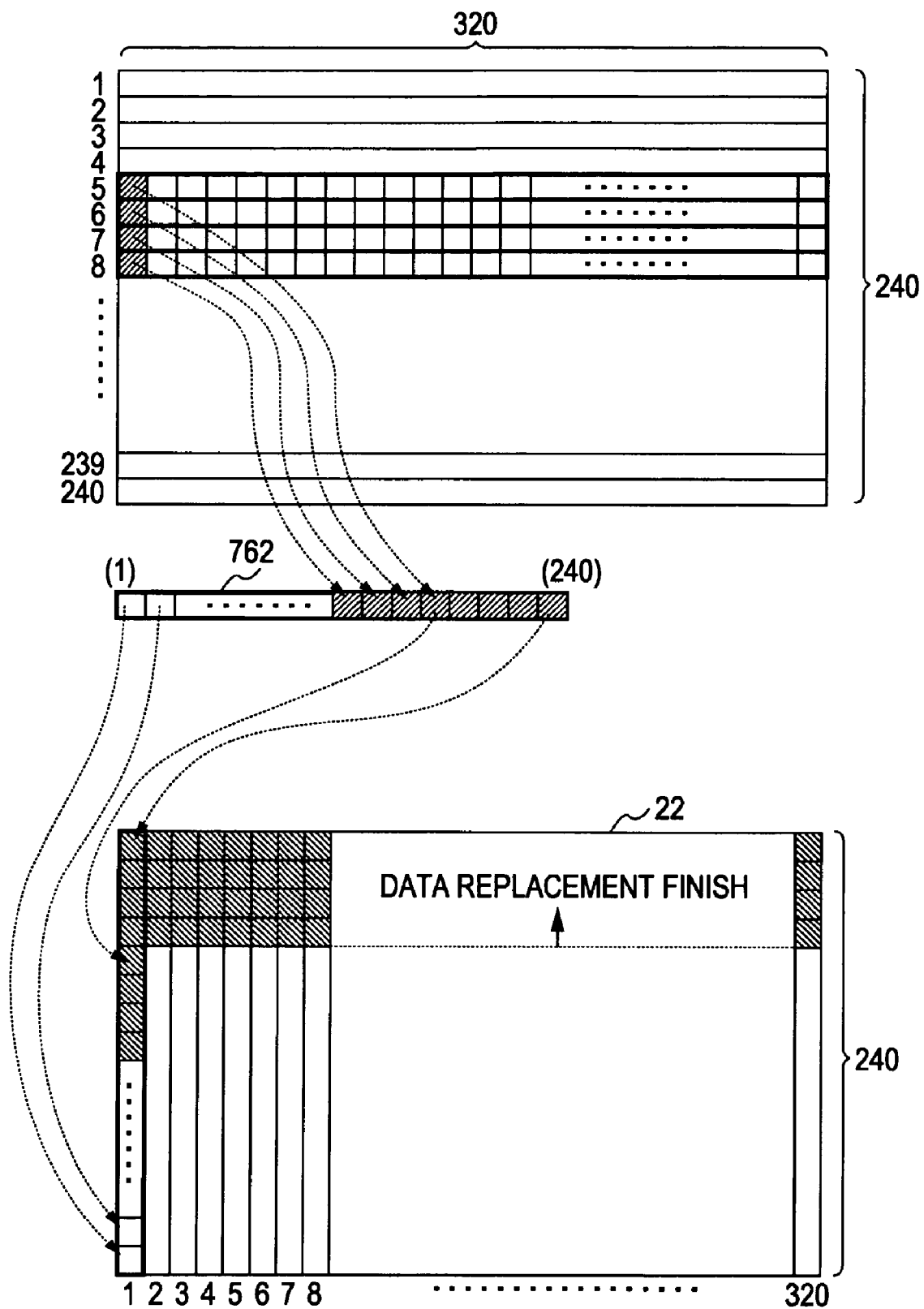
FIG. 12 is a conceptual diagram showing the partial replacement of image data.
Figure 13:
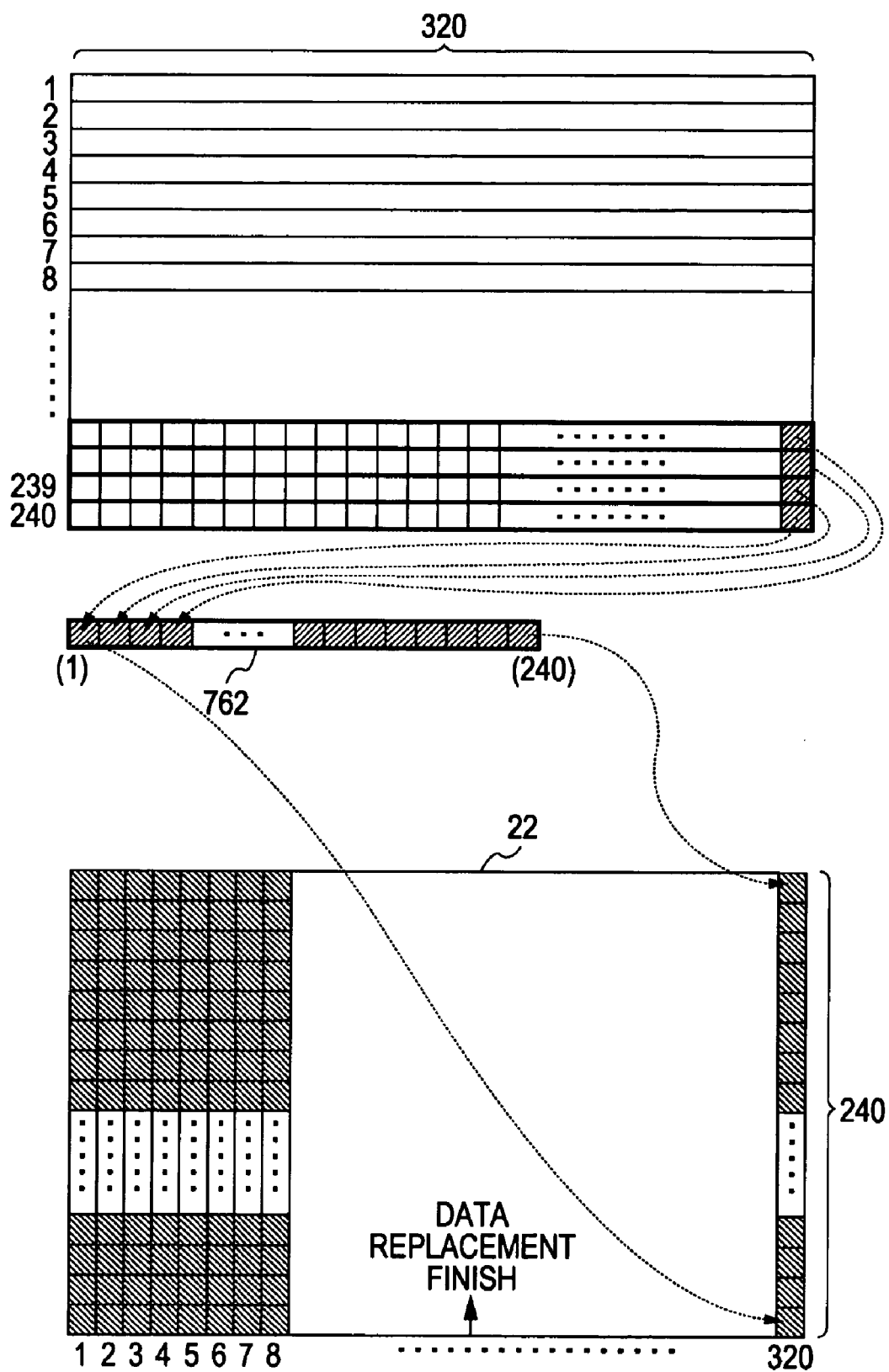
FIG. 13 is a conceptual diagram showing the partial replacement of image data.

FIG. 7 is a timing chart showing a timing when the input image data is input to the data replacement control unit 763 and a timing when the input image data is held in the first and second buffers 763$d$ and 763$e$. FIG. 8 is a timing chart showing a timing when the replacement of the pixel data is performed in a first replacement process. FIG. 9 is a conceptual diagram showing the partial replacement of the line data of a first line restored by the expansion unit 767 in the first replacement process. FIG. 10 is a conceptual diagram showing the partial replacement process of the line data of a second line restored by the expansion unit 767 in the first replacement process. FIG. 11 is a conceptual diagram showing the partial replacement process of the line data of a 320$^{th}$ line restored by the expansion unit 767 in the first replacement process. FIG. 12 is a conceptual diagram showing the partial replacement process of the line data of a first line restored by the expansion unit 767 in a second replacement process. FIG. 13 is a conceptual diagram showing the partial replacement process of the line data of a 320$^{th}$ line restored by the expansion unit 767 in a 60$^{th}$ replacement process.

In this embodiment, the vertical synchronization signal is generated by the synchronization signal generation unit 769 in a period of 1/60 sec, and the compressed data of one frame stored in the VRAM 766 is read whenever the vertical synchronization signal is output (frame period), is restored by the expansion unit 767 and is displayed on the display unit 22. In addition, whenever the horizontal synchronization signal is output by the synchronization signal generation unit 769, the compressed data of one line is read from the VRAM 766. At this time, as described above, the pixel data is sequentially expanded and restored from the leading pixel data of each line, but the restored pixel data is sequentially output to the data replacement control unit 763. In addition, the replacement determination unit 763$a$ determines whether or not the image (pixel) data output from the expansion unit 767 is replaced with the input image data stored in the first and second buffers 763$d$ and 763$e$.

As shown in FIG. 7, when the input of the input image data from the image processing module 75 to the LCD controller 76 is started, the holding of the line data of four lines of the input image data in the first buffer 763$d$ is started. When the holding of the line data of four lines in the first buffer 763$d$ is completed, the holding of the line data of subsequent four lines in the second buffer 763$e$ is started. Thereafter, until all the input image data is input to the LCD controller 76, the holding of the line data of four lines in the first and second buffers 763$d$ and 763$e$ is alternately repeated. Meanwhile, when the vertical synchronization signal is output at a time T1 after the holding of the line data of first to fourth lines of the input image data in the first buffer 763$d$ is completed, the first replacement process is started (see FIG. 8).

If the vertical synchronization signal is output at the time T1, as shown in FIGS. 8 and 9, first, when the horizontal synchronization signal is output at a time t1, the replacement determination unit 763$a$ determines that the pixel data of the 237$^{th}$ to 240$^{th}$ pixels of the line data of the first line restored by the expansion unit 767 will be replaced with the first pixel data of each line data of the fourth to first lines held in the first buffer 763$d$, respectively. In addition, as shown in FIG. 9, the pixel data of the first to 236$^{th}$ pixels of the line data of the first line restored by the expansion unit 767 is selected by the data selection unit 763$b$ and is output to the line buffer 762 by the data output unit 763$c$. Meanwhile, instead of the pixel data of the 237$^{th}$ to 240$^{th}$ pixels, the first pixel data of each line data of the fourth to first lines held in the first buffer is selected by the data selection unit 763$b$ and is output to the line buffer 762 by the data output unit 763$c$. In addition, the line data of one line temporarily stored in the line buffer 762 is compressed by the compression unit 764 and is stored in a predetermined storage area of the VRAM 766.

Next, when the horizontal synchronization signal is output at a time t2, the same process as the above-described process is performed with respect to the line data of the second line restored by the expansion unit 767. That is, the replacement determination unit 763$a$ determines that the pixel data of the 237$^{th}$ to 240$^{th}$ pixels of the line data of the second line will be replaced with the second pixel data of each line data of the fourth to first lines held in the first buffer 763$d$. In addition, as shown in FIG. 10, the pixel data of the first to 236$^{th}$ pixels of the line data of the second line restored by the expansion unit 767 is selected by the data selection unit 763$b$ and is output to the line buffer 762 by the data output unit 763$c$. Meanwhile, instead of the pixel data of the 237$^{th}$ to 240$^{th}$ pixels, the first pixel data of each line data of the fourth to first lines held in the first buffer 763$d$ is selected by the data selection unit 763$b$ and is output to the line buffer 762 by the data output unit 763$c$. In addition, the line data of one line temporarily stored in the line buffer 762 is compressed by the compression unit 764 and is stored in a predetermined storage area of the VRAM 766.

Subsequently, the same process is repeated with respect to each restored line data, and the process for the line data of the 320$^{th}$ line restored by the expansion unit 767 is performed at the last of the first replacement process (see FIG. 11). That is, the replacement determination unit 763$a$ determines that the pixel data of the 237$^{th}$ to 240$^{th}$ pixels of the line data of the 320$^{th}$ line will be replaced with the 320$^{th}$ pixel data of each line data of the fourth to first lines held in the first buffer 763$d$. In addition, as shown in FIG. 11, the pixel data of the first to 236$^{th}$ pixels of the line data of the 320$^{th}$ line restored by the expansion unit 767 is selected by the data selection unit 763$b$ and is output to the line buffer 762 by the data output unit 763$c$. Meanwhile, instead of the pixel data of the 237$^{th}$ to 240$^{th}$ pixels, the 320$^{th}$ pixel data of each line data of the fourth to first lines held in the first buffer 763$d$ is selected by the data selection unit 763$b$ and is output to the line buffer 762 by the data output unit 763$c$. In addition, the line data of one line temporarily stored in the line buffer 762 is compressed by the compression unit 764 and is stored in a predetermined storage area of the VRAM 766, and the first replacement process is completed.

Next, as shown in FIG. 8, when the vertical synchronization signal is output at a time T2, if the holding of the line data of four lines of the fifth to eighth lines of the input image data in the second buffer 763$e$ is completed, the second replacement process is started (see FIG. 12). That is, as shown in FIG. 12, the replacement determination unit 763$a$ determines that the pixel data of the 233$^{th}$ to 236$^{th}$ pixels of the line data of the first line restored by the expansion unit 767 will be replaced with the first pixel data of each line data of the eighth to fifth lines held in the first buffer 763$d$. In addition, the pixel data of the first to 232$^{th}$ pixels and the 237$^{th}$ to 240$^{th}$ pixels of the line data of the first line restored by the expansion unit 767 is selected by the data selection unit 763b and is output to the line buffer 762 by the data output unit 763c. Meanwhile, instead of the pixel data of the $233^{th}$ to $236^{th}$ pixels, the first pixel data of each line data of the eighth to fifth lines held in the second buffer 763e is selected by the data selection unit 763b and is output to the line buffer 762 by the data output unit 763c. In addition, the line data of one line temporarily stored in the line buffer 762 is compressed by the compression unit 764 and is stored in a predetermined storage area of the VRAM 766. In addition, the pixel data of the $237^{th}$ to $240^{th}$ pixels of the line data of the first line is already replaced with the input image data in the first replacement process.

The same process is repeated and the process for the line data of the $320^{th}$ line restored by the expansion unit 767 is performed at the last of the $60^{th}$ replacement process (see FIG. 13). That is, the replacement determination unit 763a determines that the pixel data of the first to fourth pixels of the line data of the $320^{th}$ line will be replaced with the $320^{th}$ pixel data of each line data of the $240^{th}$ to $237^{th}$ lines held in the second buffer. In addition, as shown in FIG. 13, the pixel data of the fifth to $240^{th}$ pixels of the line data of the $320^{th}$ line restored by the expansion unit 767 is selected by the data selection unit 763b and is output to the line buffer 762 by the data output unit 763c. Meanwhile, instead of the pixel data of the first to fourth pixels, the $320^{th}$ pixel data of each line data of the fourth to first lines held in the second buffer 763e is selected by the data selection unit 763b and is output to the line buffer 762 by the data output unit 763c. In addition, the line data of one line temporarily stored in the line buffer 762 is compressed by the compression unit 764 and is stored in a predetermined storage area of the VRAM 766, and the $60^{th}$ replacement process is completed. Accordingly, all the compressed data in the VRAM 766 is replaced with the input image data.

As described above, in the present embodiment, the line data of four lines of the input image data in which one frame is configured by the line data (320 pixels/one line) of 240 lines is held in the first buffer 763d or the second buffer 763e. In addition, by the data replacement control unit 763, at the time of reading the compressed data of the image data of one frame configured by the line data (240 pixels/one line) of 320 lines from the VRAM 766, the replacement process of replacing four lines held in the first buffer 763d or the second buffer 763e of the image data restored by the expansion unit 767 with the input image data and output the image data to the compression unit 764 is performed, and all the compressed data of the VRAM 766 is replaced with the input image data by repeating this replacement process 60 times.

That is, in the $n^{th}$ ($1 \leq n \leq 60$) replacement process, the pixel data of the input image data of four lines held in the first buffer 763d or the second buffer 763e is rearranged so as to be matched to the configuration of the VRAM 766 by the data replacement control unit 763 and is replaced with a portion of each line data configuring the image data restored by the expansion unit 767. By reading and restoring the compressed data, of which the portion is replaced with the input image data, from the VRAM 766 by the expansion unit 767, the image in which the portion of the original image is replaced with the input image is displayed on the display unit 22. By repeating this process 60 times, all the pixel data configuring the input image data can be rearranged so as to be matched to the configuration of the VRAM 766 and the compressed data of the input image data in which the pixel data is rearranged can be stored in the VRAM 766. Accordingly, the rearrangement of the pixel data configuring the input image data can be performed by using the image data restored from the compressed data in the VRAM 766 and holding the input image data of at least four lines in one replacement process, and the image based on the input image data can be displayed on the display unit 22 of which the scan direction differs from the arrangement order of the pixel data configuring the input image data, with a simple configuration with low cost.

Figure 14:
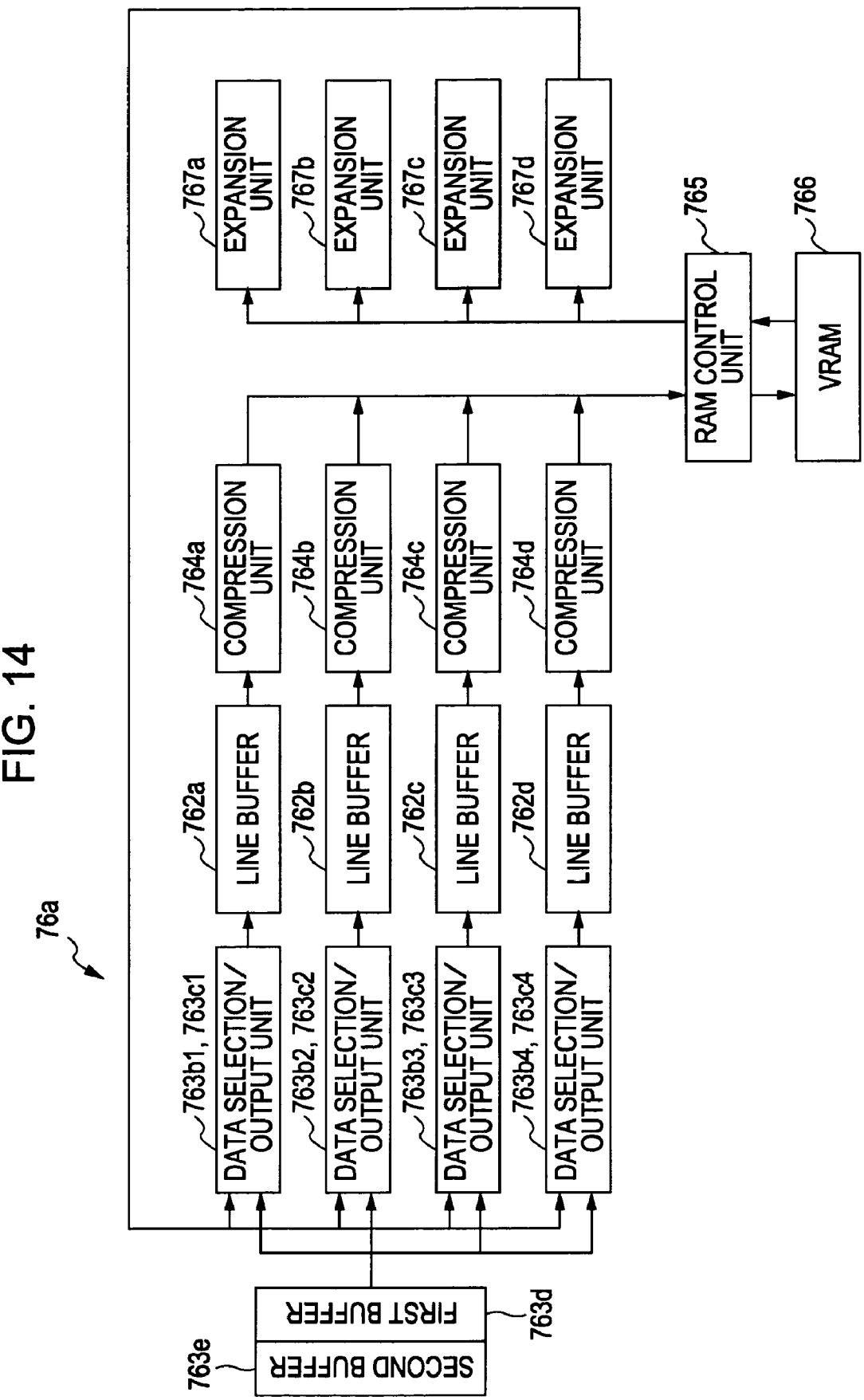
FIG. 14 is an enlarged view of main portions of a modified example of the screen display control device of the invention.

In addition, the invention is not limited to the above-described embodiment and may be variously modified without departing from the scope of the invention, in addition to the above description. For example, although the first and second buffers 763d and 763e are configured so as to hold four pieces of line data of the input image data in the above-described embodiment, the number of pieces of line data which can be held in the first buffer 763d or the second buffer 763e is not limited to four and any configuration is possible if the number of pieces of line data is equal to or less than 240. That is, the size of the memory capacity of the first buffer 763d and the second buffer 763e may be determined by the relationship with the manufacturing cost of the apparatus. Although two buffers such as the first buffer 763d and the second buffer 763e for holding the line data of four lines are provided in order to realize the rapid process in the above-described embodiment, the number of buffers functioning as the unit for holding the input image data is not limited to this and may be one or three or more. As shown in FIG. 14, a plurality of line buffers 762 and expansion units 767 may be provided.

FIG. 14 is an enlarged view of main portions of a modified example of the screen display control device (LCD controller) 76a of the invention. The screen display control device 76a shown in FIG. 14 is different from the LCD controller 76 of FIG. 3 in that a plurality (four) of line buffers 762a to 762d and expansion units 767a to 767d are included so as to simultaneously process plural pieces of line data stored in the VRAM 766. Since the other configuration and operation are equal to the configuration and operation of the LCD controller 76, the same reference numerals are used and the description of the configuration and operation will be omitted. In such a configuration, since the compressed data of four lines stored in the VRAM 766 can be simultaneously processed, it is possible to realize the speed-up of the replacement process of the restored image data with the input image data. In addition, at this time, since the speed-up of the data process in the screen display control device 76a can be realized, it is preferable that the input speed of the input image data from the image processing module 75 to the screen display control device 76a is increased by increasing the clock.

In addition, in the above-described embodiment, the input speed of the input image data from the image processing module 75 to the LCD controller 76 is decreased compared with the processing speed of the replacement process of the image data in the LCD controller 76, during the execution of the process of holding the line data of four lines of the input image data in any one of the first and second buffers 763d and 763e, the process of replacing the image data restored by the expansion unit 767 with the input image data using the line data of the input image data held in the other buffer is completed. By such a configuration, after the process of holding of the line data of four lines in one buffer is completed, the subsequent line data can be held in the other buffer with certainty. In synchronization with the vertical synchronization signal, the line data of the input image data may be input to the LCD controller 76 four lines by four lines.

Although the display unit 22 for performing the screen scanning in a direction from a lower side to an upper side is employed as shown in FIG. 6 in the above-described embodiment, a display unit for performing screen scanning in a direction from the upper side to the lower side may be employed. At this time, it is preferable that the replacement determination unit 763$a$ is configured so as to replace $((n-1)M+1)^{th}$ to $nM^{th}$ pixel data of the $m^{th}$ (m: $1 \leq m \leq X$) line data configuring the image data restored by the extension unit 767 with the $m^{th}$ pixel data of each line data of the $((n-1)M+1)^{th}$ to $nM^{th}$ lines of the input image data, at the time of the $n^{th}$ replacement process.

Although the ink cartridge type photo printer 10 is, for example, described in the above-described embodiment, the invention is applicable to the other printing apparatuses such as an ink jet printer. The invention is widely applicable to the technique of displaying the image on a screen display device such as a liquid crystal display, a plasma display or an organic EL display. Although the configuration for displaying the landscape type input image data on the portrait type display unit 22 is described in the above-described embodiment, a configuration for displaying portrait type input image data on a landscape type display unit 22 may be employed. That is, the invention is widely applicable to the case where the arrangement order of the pixel data configuring the input image data and the scanning order of various types of display are different.

What is claimed is:

1. A screen display control device comprising:
a compression unit which compresses image data;
a rewritable video memory in which the data compressed by the compression unit of image data of one frame including line data (Y (Y: natural number) pixels/one line) of X (X: natural number) lines is written asynchronously with reading;
an expansion unit which expands the compressed data which is periodically read from the video memory in synchronization with a frame period of a screen display, and restores original image data;
a display unit which displays an image of the image data expanded and restored by the expansion unit;
an input image data holding unit which holds input image data of one frame including line data (X pixels/one line) of Y lines by M (M: natural number, M<Y) lines; and
a data replacement control unit which performs a replacement process of replacing the M lines held in the input image data holding unit of the image data restored by the expansion unit with the input image data and outputting the replaced data to the compression unit, at the time of reading the compressed data of one frame from the video memory, and replaces all the compressed data of the video memory with the input image data by repeating the replacement process n (n: natural number of $1 \leq n \leq Y/M$) times,
wherein the data replacement control unit replaces $(Y-nM+1)^{th}$ to $(Y-(n-1)M)^{th}$ pixel data of $m^{th}$ (m: $1 \leq m \leq X$) line data configuring the image data restored by the expansion unit with $m^{th}$ pixel data of each line data of $nM^{th}$ to $((n-1)M+1)^{th}$ lines of the input image data, at the time of an $n^{th}$ replacement process.

2. A screen display control device comprising:
a compression unit which compresses image data;
a rewritable video memory in which the data compressed by the compression unit of image data of one frame including line data (Y (Y: natural number) pixels/one line) of X (X: natural number) lines is written asynchronously with reading;
an expansion unit which expands the compressed data which is periodically read from the video memory in synchronization with a frame period of a screen display, and restores original image data;
a display unit which displays an image of the image data expanded and restored by the expansion unit;
an input image data holding unit which holds input image data of one frame including line data (X pixels/one line) of Y lines by M (M: natural number, M<Y) lines; and
a data replacement control unit which performs a replacement process of replacing the M lines held in the input image data holding unit of the image data restored by the expansion unit with the input image data and outputting the replaced data to the compression unit, at the time of reading the compressed data of one frame from the video memory, and replaces all the compressed data of the video memory with the input image data by repeating the replacement process n (n: natural number of $1 \leq n \leq Y/M$) times,
wherein the data replacement control unit replaces $((n-1)M+1)^{th}$ to $m^{th}$ pixel data of $m^{th}$ (m: $1 \leq m \leq X$) line data configuring the image data restored by the expansion unit with $m^{th}$ pixel data of each line data of $((n-1)M+1)^{th}$ to $nM^{th}$ lines of the input image data, at the time of an $n^{th}$ replacement process.

* * * * *